(12) United States Patent
Race et al.

(10) Patent No.: US 9,334,737 B2
(45) Date of Patent: May 10, 2016

(54) BALANCE WEIGHT INSTALLATION SYSTEM AND RELATED METHOD

(75) Inventors: Nathan Stafford Race, Simpsonville, SC (US); Christopher Parker Crookshanks, Cumming, GA (US); Michael Alan Davi, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 880 days.

(21) Appl. No.: 13/586,165

(22) Filed: Aug. 15, 2012

(65) Prior Publication Data

US 2014/0050566 A1  Feb. 20, 2014

(51) Int. Cl.
*F01D 5/02*  (2006.01)

(52) U.S. Cl.
CPC ........... *F01D 5/027* (2013.01); *Y02E 20/16* (2013.01); *Y10T 29/4932* (2015.01); *Y10T 74/2121* (2015.01)

(58) Field of Classification Search
CPC ........... F01D 5/027; F01D 5/10; F01D 25/04; F01D 25/06; Y10T 74/2121
See application file for complete search history.

(56) References Cited

U.S. PATENT DOCUMENTS

| | | | |
|---|---|---|---|
| 5,056,387 A * | 10/1991 | Cook | 81/456 |
| 6,279,420 B1 * | 8/2001 | Knorowski et al. | 464/180 |
| 6,291,916 B1 | 9/2001 | Huang et al. | |
| 6,293,146 B1 | 9/2001 | Jin | |
| 6,553,831 B1 | 4/2003 | Schmidt et al. | |
| 6,676,224 B2 | 1/2004 | Kogure et al. | |
| 6,719,374 B2 | 4/2004 | Johnson | |
| 7,044,561 B2 | 5/2006 | Petchel et al. | |
| 7,912,587 B2 | 3/2011 | Walters et al. | |
| 2002/0134191 A1 | 9/2002 | Czerniak et al. | |
| 2003/0213334 A1 | 11/2003 | Czerniak et al. | |
| 2005/0104438 A1 | 5/2005 | Petchel et al. | |
| 2006/0138854 A1 | 6/2006 | Le Moal et al. | |
| 2006/0236796 A1 | 10/2006 | Harada | |
| 2008/0088173 A1 | 4/2008 | Chanchareon | |
| 2009/0169383 A1 | 7/2009 | Lamborn et al. | |
| 2009/0230757 A1 | 9/2009 | Chancharoen | |

* cited by examiner

*Primary Examiner* — Christopher Verdier
*Assistant Examiner* — Juan G Flores
(74) *Attorney, Agent, or Firm* — Ernest G. Cusick; Hoffman Warnick LLC

(57) ABSTRACT

Systems, methods, and devices, adapted to ease installation of balance weights about a turbine are disclosed. In one embodiment, a device includes: a base including a hollow feature and an operative tip configured to connect to a balance weight; and an inner component disposed within the hollow feature of the base, the inner component including an inner tip at a first end, the inner tip configured to manipulate a set screw connected to the balance weight.

13 Claims, 7 Drawing Sheets

BALANCE WEIGHT INSTALLATION SYSTEM AND RELATED METHOD

BACKGROUND OF THE INVENTION

The subject matter disclosed herein relates to turbines and, more particularly, to systems and methods for the installation of balance weights within and upon components of a turbine.

Some power plant systems, for example certain nuclear, simple cycle and combined cycle power plant systems, employ turbines in their design and operation. Some of these turbines include rotating components and assemblies (e.g., a drum rotor, a wheel and diaphragm rotor, etc.) which during operation rotate at high speeds and tight clearances within a housing of the turbine. Balancing of these components or assemblies (e.g., uniform weight distribution about a center point of the rotor) may be required for efficient and safe operation of these turbines, reducing wear and vibrations. Some systems may be initially unbalanced as a result of manufacturing variations, material compositions, design choices, component orientations, etc. In these systems, balance weights (e.g., rotor balance weights, trim balance weights, etc.) may be used to balance these unbalanced components once they have been installed in the turbine housing/shell. These balance weights may be secured by a technician about the turbine (e.g., on a wheel, on a shaft, etc.) during assembly, the location and size of these balance weights chosen to counteract a known unbalance in the system. In some systems, these balance weights are located on the outer turbine wheels (e.g., where access is convenient). However, even on outer turbine wheels, installation may be difficult and/or limited by equipment configuration, as access to the outer turbine wheels requires work through small access apertures covered by removable hatches. These small access apertures are configured to avoid major disassembly for turbine maintenance by allowing limited access to internal portions of the turbine. However, access aperture size may complicate and limit maintenance processes with traditional tools where long reach and precise maneuvering is required for proper installation.

BRIEF DESCRIPTION OF THE INVENTION

Systems, methods, and devices, adapted to ease installation of balance weights about a turbine are disclosed. In one embodiment, a device includes: a base including a hollow feature and an operative tip configured to connect to a balance weight; and an inner component disposed within the hollow feature of the base, the inner component including an inner tip at a first end, the inner tip configured to manipulate a set screw connected to the balance weight.

A first aspect of the disclosure provides a device including: a base including a hollow feature and an operative tip configured to connect to a balance weight; and an inner component disposed within the hollow feature of the base, the inner component including an inner tip at a first end, the inner tip configured to manipulate a set screw connected to the balance weight.

A second aspect provides a system including: a balance weight including a set-screw; a base including a hollow feature and an operative tip connected to the balance weight; and an inner component disposed within the hollow feature of the base, the inner component including an inner tip configured to manipulate the set screw.

A third aspect provides a method including: connecting a base of a device to a balance weight, the balance weight including a set screw and the device including an inner component with an inner tip configured to manipulate the set screw; maneuvering the balance weight within a turbine via the device; and connecting the balance weight to the turbine.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
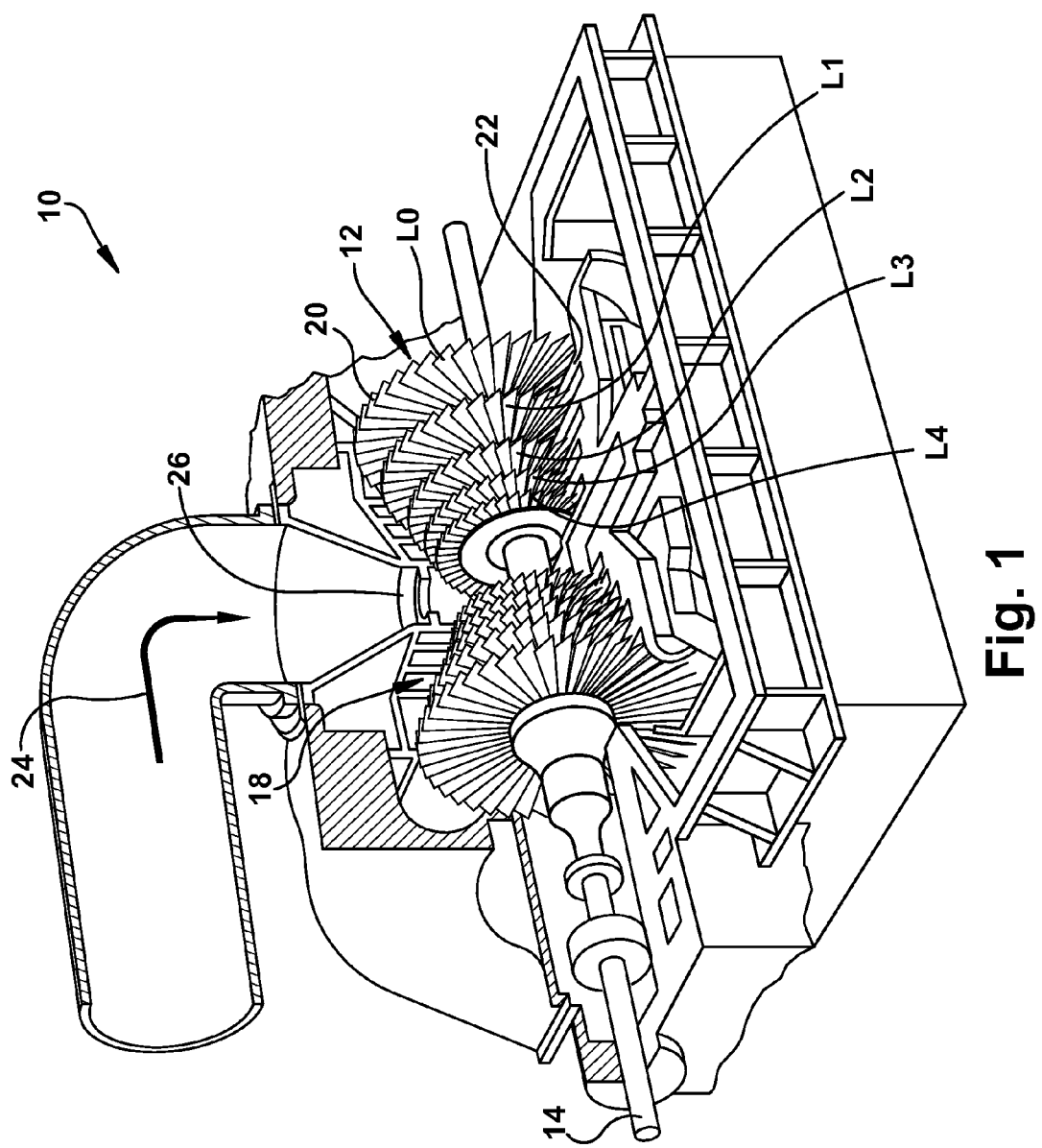
FIG. 1 shows a three-dimensional partial cut-away perspective view of a portion of a turbine according to an embodiment of the invention.

It is noted that the drawings of the disclosure are not necessarily to scale. The drawings are intended to depict only typical aspects of the disclosure, and therefore should not be considered as limiting the scope of the disclosure. It is understood that elements similarly numbered between the FIGURES may be substantially similar as described with reference to one another. Further, in embodiments shown and described with reference to FIGS. 1-7, like numbering may represent like elements. Redundant explanation of these elements has been omitted for clarity. Finally, it is understood that the components of FIGS. 1-7 and their accompanying descriptions may be applied to any embodiment described herein.

DETAILED DESCRIPTION OF THE INVENTION

As indicated herein, aspects of the invention provide for systems, methods and devices adapted to increase reach and ease assembly/balancing of a rotating sub-assembly (e.g., installation of balance weights) within a turbine, thereby reducing vibration and improving turbine operational efficiency and longevity. Embodiments of the current invention include a device with an operative tip which is configured to attach (e.g., thread into) to a balance weight (e.g., via a countersink). The device enables a technician to manipulate and/or maneuver the attached balance weight within a turbine with limited access (e.g., through an access aperture). The technician may use the device to position, adjust and locate the balance weight to a desired position (e.g., within a groove or a slot of a turbine wheel). Once the balance weight is located, the technician may actuate an inner tip of an inner component disposed within a hollow feature of the base to manipulate a position of a set screw in the balance weight, thereby securing the balance weight in the turbine. In one embodiment, the inner component may be rotated within the base to extend the set screw of the balance weight toward the turbine. As the set screw extends, it may contact the turbine (e.g., bottoming out on a surface of the groove) and forcing the balance weight to contact groove surfaces, pressing the balance weight against portions of the groove and thereby securing the balance weight within the groove. In another embodiment, the set screw may be threaded into a set of mating threads in an aperture defined in the turbine. The device may further include a staking component which may stake the set screw, the balance weight and/or the turbine wheel to secure the balance weight in the groove once the balance weight has been located in the desired location. In one embodiment, once the balance weight is in place and the set screw is secured, the staking component may stake (e.g., be driven into a surface of a component, causing the component to deform and thereby locally stake and restrict rotation of the component) at least one of: the set screw against the balance weight, the balance weight against the set screw, and/or a portion of the turbine against the balance weight to prevent rotation of the balance weight. The device may then be removed from the turbine by disconnecting the base from the countersink of the balance weight (e.g., unthreaded) and withdrawing the device from the turbine, leaving the balance weight in the desired position on the turbine.

Turning to the FIGURES, embodiments of systems, methods, and devices, adapted to increase the reach of technicians and ease installation of balance weights about a turbine are shown. Each of the components in the FIGURES may be connected via conventional means, e.g., via a bolt, screw, weld, or other known means as is indicated in FIGS. 1-7. Referring to the drawings, FIG. 1 shows a perspective partial cut-away illustration of a gas or steam turbine 10. Turbine 10 includes a rotor 12 that includes a rotating shaft 14 and a plurality of axially spaced rotor wheels 18. A plurality of rotating blades 20 are mechanically coupled to each rotor wheel 18. More specifically, blades 20 are arranged in rows that extend circumferentially around each rotor wheel 18. A plurality of stationary vanes 22 extend circumferentially around shaft 14, and the vanes are axially positioned between adjacent rows of blades 20. Stationary vanes 22 cooperate with blades 20 to form a stage and to define a portion of a gas and/or steam flow path through turbine 10.

In operation, gas or steam 24 enters an inlet 26 of turbine 10 and is channeled through stationary vanes 22. Vanes 22 direct gas or steam 24 downstream against blades 20. Gas or steam 24 passes through the remaining stages imparting a force on blades 20 causing shaft 14 to rotate. At least one end of turbine 10 may extend axially away from rotating shaft 12 and may be attached to a load or machinery (not shown) such as, but not limited to, a generator, and/or another turbine.

In one embodiment, turbine 10 may include five stages. The five stages are referred to as L0, L1, L2, L3 and L4. Stage L4 is the first stage and is the smallest (in a radial direction) of the five stages. Stage L3 is the second stage and is the next stage in an axial direction. Stage L2 is the third stage and is shown in the middle of the five stages. Stage L1 is the fourth and next-to-last stage. Stage L0 is the last stage and is the largest (in a radial direction). It is to be understood that five stages are shown as one example only, and each turbine may have more or less than five stages. Also, as will be described herein, the teachings of the invention do not require a multiple stage turbine.

Figure 2:
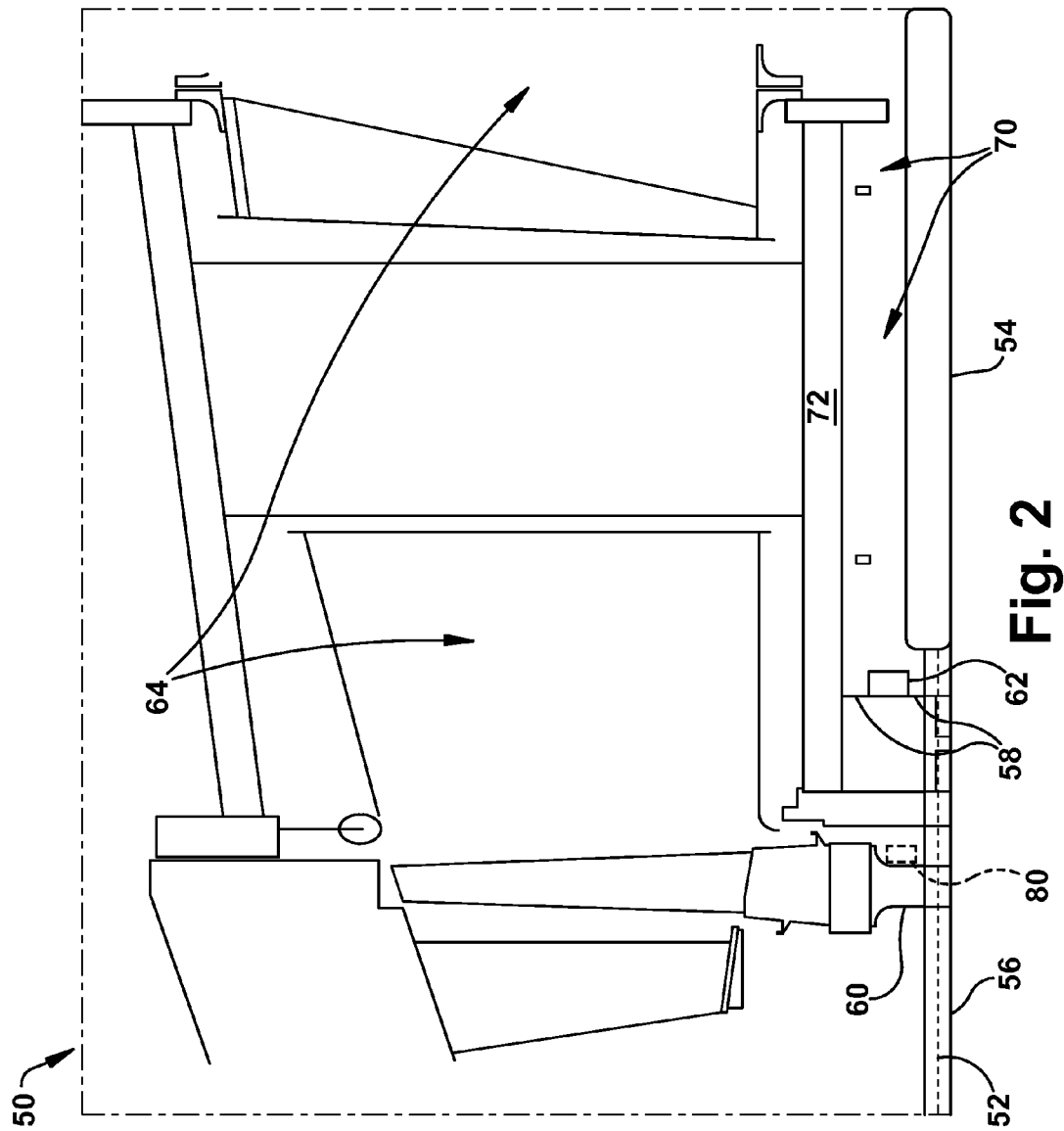
FIG. 2 shows a schematic block diagram of a portion of a system according to an embodiment of the invention.

Turning to FIG. 2, a partial cut-away illustration of a portion of a turbine 50 (e.g., a gas turbine) is shown according to embodiments. Turbine 50 includes a rotating component 60 (e.g., an outer turbine wheel) which is connected to a rotor 56 of turbine 50. During operation, rotor 56 may rotate within turbine 50 via a connection with a bearing 54. As discussed herein, unbalanced rotation of rotor 56 and/or component 60 about a centerline 52 of turbine 50 may produce vibrations. In an embodiment, a technician access space 70 may be defined between bearing 54 and a casing 72 of turbine 50 which partially defines a flowpath 64 of turbine 50. Technician access space 70 may enable a technician to crawl within a portion of turbine 50 to an inner turbine wall 58. The technician may access inner portions of turbine 50 through an access aperture 62 formed in inner turbine wall 58. In an embodiment, the technician may manipulate and/or connect a balance weight 80 (shown in phantom) to component 60 (e.g., via a device 120 shown in FIG. 3) through access aperture 62.

Figure 3:
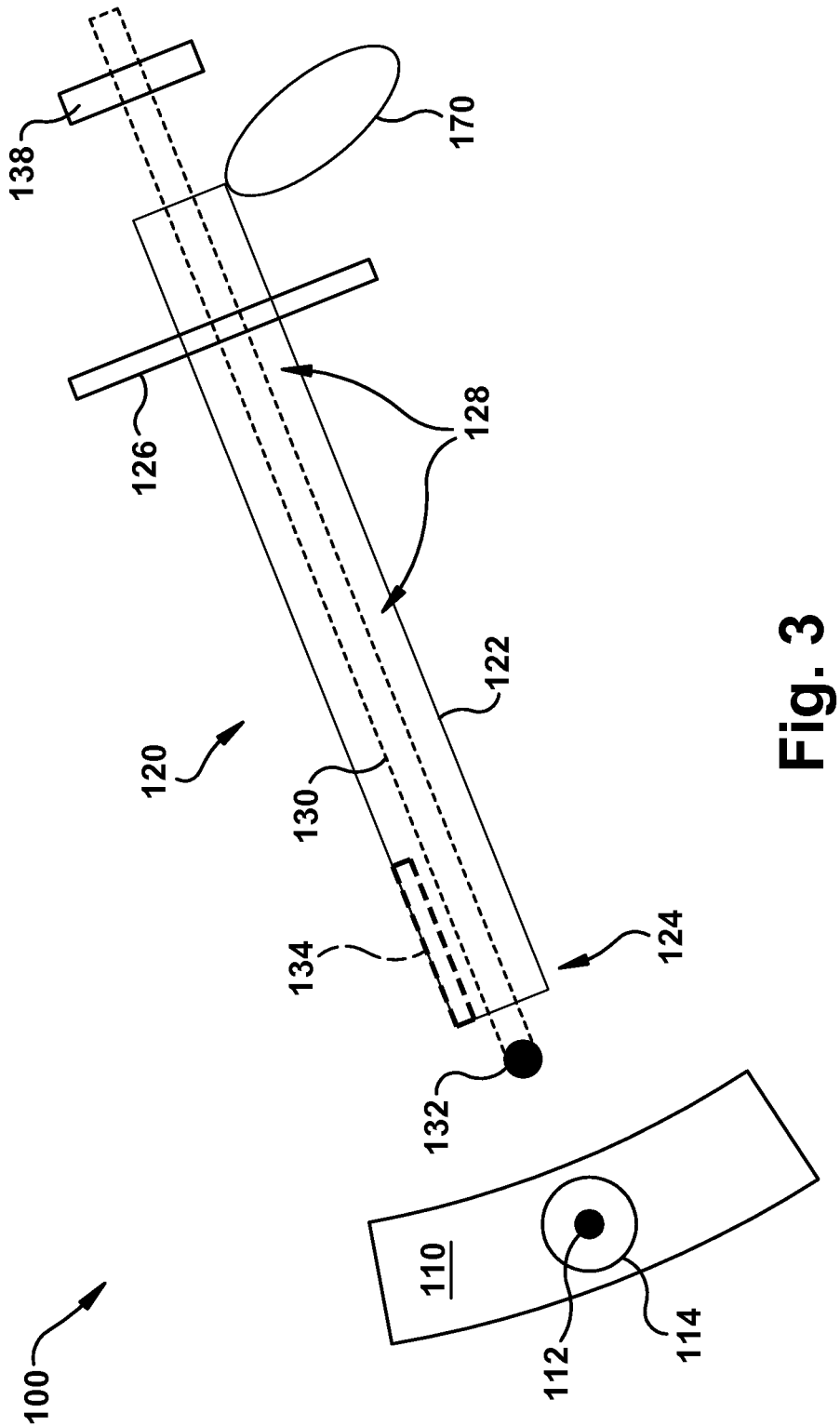
FIG. 3 shows a schematic block diagram of a portion of a system according to an embodiment of the invention.

Specifically, referring to FIG. 3, a schematic block diagram of a portion of a system 100 including a balance weight 110 and a device 120 is shown according to embodiments of the invention. In this embodiment, balance weight 110 defines a counter sink 114 configured to complement an operative tip 124 on a base 122 of device 120. During operation, operative tip 124 may connect (e.g., thread, affix, insert, etc.) to counter sink 114, thereby securing balance weight 110 to device 120 for adjustment, maneuvering, and manipulation within turbine 50 (shown in FIG. 2). In one embodiment, counter sink 114 may define a set of threads configured to mate with a complementary set of threads on operative tip 124. The threads on operative tip 124 and countersink 114 may be configured with traditional threading (e.g., threading which connects the two components when threaded in a clockwise direction) or reverse threading (e.g., threading which connects the two components when threaded in a counter-clockwise direction). Base 122 may include a first handle 126 for manipulation of device 120 and balance weight 110, and a strap 170 configured to affix to an object (e.g., a technician, an instrument, etc.) and prevent device 120 from being dropped in turbine 50 (shown in FIG. 2). In one embodiment, first handle 126 and base 122 may be configured to form a geometric shape with dimensions larger than access aperture 62 (shown in FIG. 2) in turbine 50 (e.g., between a turbine shell and a rotor), the shape preventing (e.g., making it geometrically impossible) device 120 from fitting within and/or being accidentally dropped into portions and/or cavities of turbine 50 (shown in FIG. 2).

In an embodiment, base 122 may include/define a hollow feature 128 (e.g., cylindrical tube/cavity) which is configured to receive an inner component 130 (shown in phantom). Inner component 130 may rotate within base 122 and include an inner tip 132 configured to complement/mate with a portion of a set screw 112 disposed within counter sink 114 of balance weight 110. Inner tip 132 may include a patterned tip, a magnetic tip, a hexagonal pattern, a crescent pattern, a Phillips pattern, or any other threading/attachment method as are known. In one embodiment, inner component 130 may be retained within hollow feature 128 via a linear bearing and a 'C' clip. Inner component 130 may include a threading handle 138 located at an end of inner component 130 substantially opposite inner tip 132. In one embodiment, insertion of inner component 130 into base 122 may include use of a keyway, groove, or like alignment system configured to align inner component 130 relative balance weight 110 and/or countersink 114. In another embodiment, inner tip 132 may include a magnet and/or epoxy configured to connect to and/or manipulate set screw 112. In one embodiment, base 122 may define a slot 134 (shown in phantom) configured to receive a portion of a staking component (e.g., staking component 200 shown in FIG. 4). In one embodiment, slot 134 may include a keyed slot.

Figure 4:
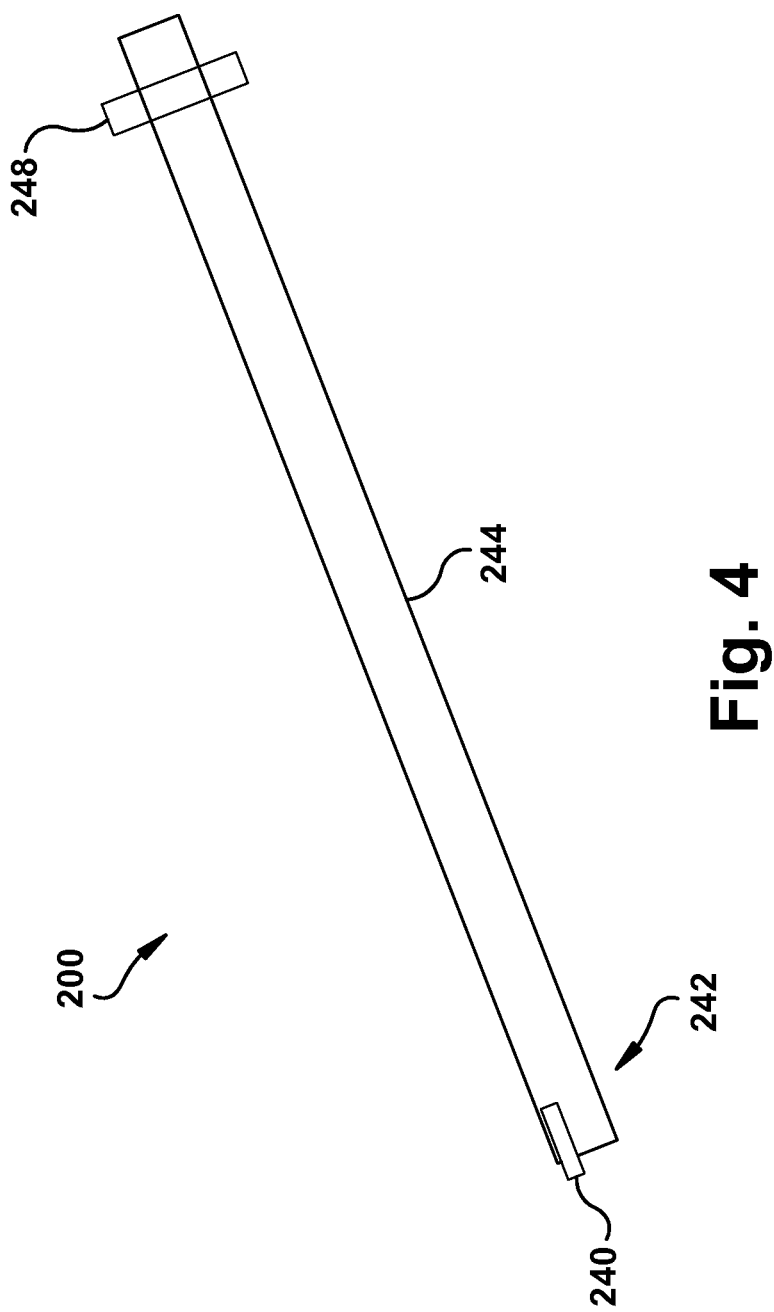
FIG. 4 shows a schematic block diagram of a portion of a system according to an embodiment of the invention.

Turning to FIG. 4, a schematic block diagram of a portion of a staking component 200 is shown according to embodiments of the invention. In an embodiment, staking component 200 may include a staking tip 240 located at a first end 242 of staking component 200 opposite a third handle 248. Staking component 200 may include a shaft 244 configured to insert within hollow feature 128 of base 120 (shown in FIG. 3). During operation, in one embodiment, staking component 200 may be driven (e.g., forced with momentum) into set screw 112, thereby staking set screw 112 to balance weight 110 and/or the turbine wheel. In another embodiment, staking component 200 may be driven into balance weight 110 proximate set screw 112, thereby securing set screw 112 from rotation (e.g., backing out). In another embodiment, staking component 200 may be driven into a portion of the turbine wheel proximate balance weight 110 to prevent rotation of balance weight 110. In one embodiment, staking tip 240 may be located at a center of staking component 200. In another embodiment, staking tip 240 may be located radial a center of staking component 200. During operation, staking component 200 may insert within base 120 and contact set screw 112. In one embodiment, staking tip 240 may be integrated in to inner component 130 (e.g., at an end opposite inner tip 132). In another embodiment, staking tip 240 and inner tip 132 may be interchangeable heads/tips (e.g., a socket set, tool kit, etc.) thereby enabling system 100 to be operable on a variety of turbines for a variety of functions. In one embodiment, insertion of staking component 200 into base 122 may include use of a keyway, groove, or like alignment system configured to align staking component 200 relative set screw 112, balance weight 110 and/or countersink 114. It is understood that operation of either or both of inner component 130 and staking component 200 may be manual, powered, pneumatic, electrical, magnetic, hydraulic, or any other form of operation now known or later developed.

Figure 5:
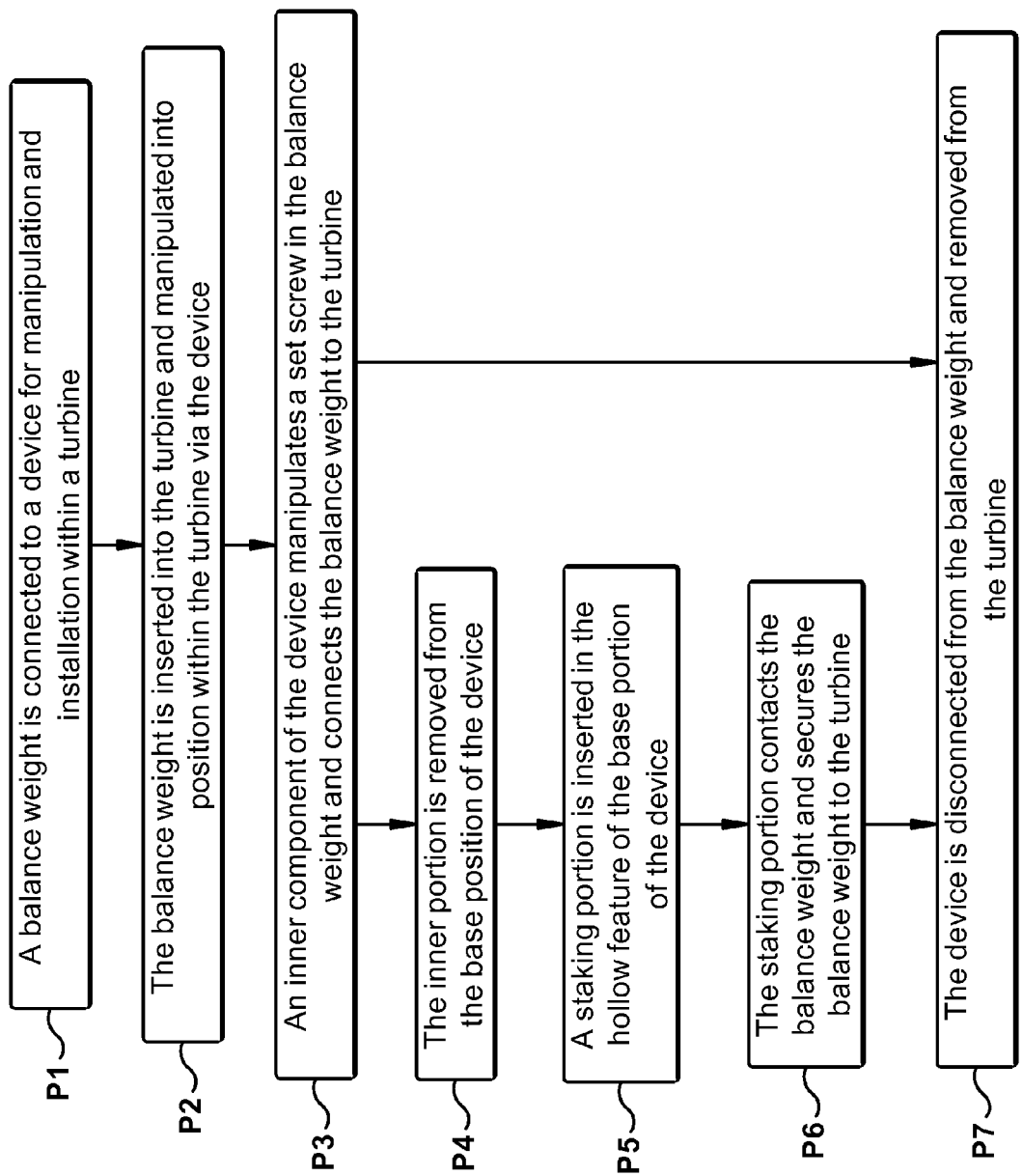
FIG. 5 shows a method flow diagram illustrating a process according to an embodiment of the invention.

Turning to FIG. 5, an illustrative method flow diagram is shown according to embodiments of the invention: In process P1, balance weight 110 is connected to device 120 and prepared for manipulation and installation in turbine 50. This may be done by technicians and/or machinery in response to a scheduled or a user prompted assembly process, and may include removal and/or separation of an outer shell of turbine 50. Connection of device 120 and balance weight 110 may include insertion and/or threading of operative tip 124 of base 122 into countersink 114. Countersink 114 may include threads configured to mate with threads on operative tip 124, thereby enabling a secure and detachable connection between device 120 and balance weight 110. Following process P1, in process P2, balance weight 110 is inserted into a portion of turbine 50 and is maneuvered and/or manipulated about a cavity within turbine 50 via device 120. Specifically, balance weight 110 is placed in an installation position (e.g., a groove, a slot, above a turbine aperture configured to receive set screw 112, etc.) via device 120. In one embodiment, balance weight 110 may be positioned within a groove in turbine 50 such that prior to the tightening of set screw 112, balance weight 110 has circumferential freedom to move about the groove but is geometrically restrained from being directly withdrawn. Following process P2, in process P3, inner component 130 manipulates set screw 112 and thereby connects set screw 112 and balance weight 110 to a component (e.g., wheel, shaft, etc.) of turbine 110, thereby securing (e.g., temporarily or permanently) balance weight 110 to turbine 50. In one embodiment, inner tip 132 may be inserted in a portion of set screw 112 such that rotation of inner component 130 threads set screw 112 toward turbine 50, causing set screw 112 to contact turbine 50 and press/secure balance weight 110 in the groove of turbine 50. In another embodiment, inner tip 132 may be inserted in a portion of set screw 112 such that rotation of inner component 130 threads set screw 112 into mating threads in a complementary aperture of turbine 50.

Following process P3, in one embodiment, in process P7, device 120 is disconnected from balance weight 110 and removed from turbine 50. Alternatively, in process P4, following connection of set screw 112 to turbine 50, inner component 130 is removed from base 122 of device 120. In one embodiment, base 122 remains connected to balance weight 110. Following process P4, in process P5, staking component 200 is inserted in base 122. Insertion of staking component 200 in base 122 may align staking tip 240 with set screw 112. In one embodiment, staking tip 240 may align with a center of set screw 112. In another embodiment, staking tip 240 may align radial relative a center of set screw 112. Following process P5, in process P6, staking component 200 contacts balance weight 110 (e.g., set screw 112) and secures set screw 112 in place, which secures balance weight 110 in position within the groove, and serves as a retention feature for balance weight 110. In one embodiment, this may include introducing a force on staking component 200 causing staking tip 240 to stake and/or drive set screw 112 in to a portion of turbine 50, thereby preventing rotation of set screw 112 and/ or dislodgment of balance weight 110. In another embodiment, staking component 200 may stake balance weight 110 and/or the turbine wheel. Following process P6, in process P7, device 120 is disconnected from balance weight 110 and removed from turbine 50. Disconnection of device 120 may include unthreading of operative tip 124 of base 122 from countersink 114.

The data flow diagram and block diagrams in the FIGURES illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 6:
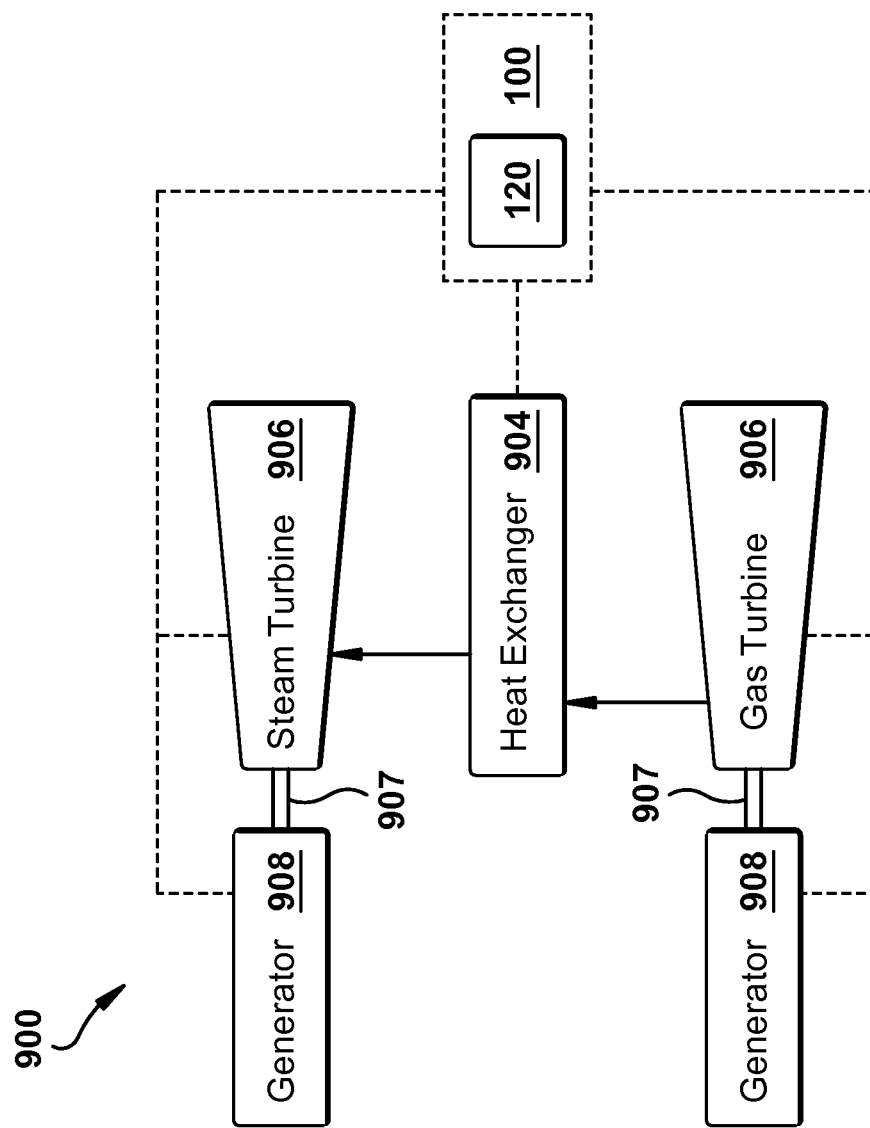
FIG. 6 shows a schematic block diagram illustrating portions of a combined cycle power plant system according to embodiments of the invention.
Figure 7:
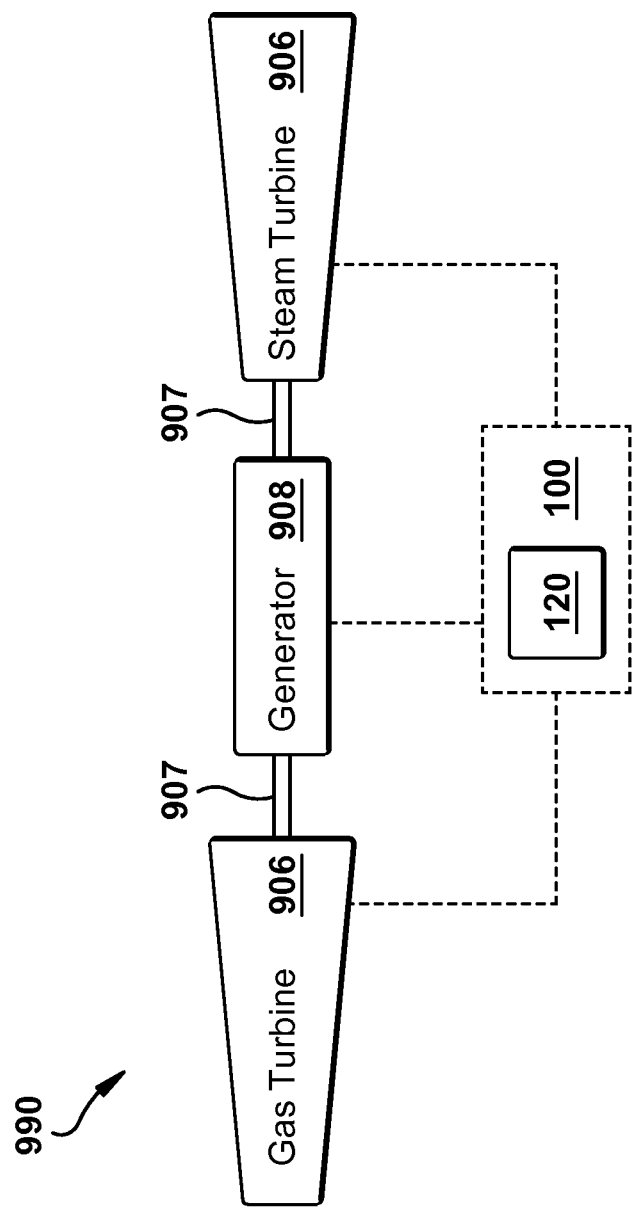
FIG. 7 shows a schematic block diagram illustrating portions of a single-shaft combined cycle power plant system according to embodiments of the invention.

Turning to FIG. 6, a schematic view of portions of a multishaft combined cycle power plant 900 is shown. Combined cycle power plant 900 may include, for example, a gas turbine 902 operably connected to a generator 908. Generator 908 and gas turbine 902 may be mechanically coupled by a shaft 907, which may transfer energy between a drive shaft (not shown) of gas turbine 902 and generator 908. Also shown in FIG. 6 is a heat exchanger 904 operably connected to gas turbine 902 and a steam turbine 906. Heat exchanger 904 may be fluidly connected to both gas turbine 902 and a steam turbine 906 via conventional conduits (numbering omitted). Maintenance and/or assembly of gas turbine 902 and/or steam turbine 906 may include use of system 100 and/or device 120 of FIG. 3 or other embodiments described herein. Heat exchanger 904 may be a conventional heat recovery steam generator (HRSG), such as those used in conventional combined cycle power systems. As is known in the art of power generation, HRSG 904 may use hot exhaust from gas turbine 902, combined with a water supply, to create steam which is fed to steam turbine 906. Steam turbine 906 may optionally be coupled to a second generator system 908 (via a second shaft 907). It is understood that generators 908 and shafts 907 may be of any size or type known in the art and may differ depending upon their application or the system to which they are connected. Common numbering of the generators and shafts is for clarity and does not necessarily suggest these generators or shafts are identical. In another embodiment, shown in FIG. 7, a single shaft combined cycle power plant 990 may include a single generator 908 coupled to both gas turbine 902 and steam turbine 906 via a single shaft 907. Maintenance and/or assembly of gas turbine 902 and/or steam turbine 906 may include use of system 100 and/or device 120 of FIG. 3 or other embodiments described herein.

The systems, methods, and devices of the present disclosure are not limited to any one particular turbine, power generation system or other system, and may be used with other power generation systems and/or systems (e.g., combined cycle, simple cycle, nuclear reactor, etc.). Additionally, the systems, methods, and devices of the present invention may be used with other systems not described herein that may benefit from the stability, ease of installation and securing ability described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A device comprising:
    a base including a hollow feature and an operative tip configured to connect to a balance weight; and
    an inner component configured to be inserted within the hollow feature of the base, the inner component including an inner tip, the inner tip configured to manipulate a set screw connected to the balance weight, wherein the inner component is configured to be removed from the hollow feature of the base, and
    a staking component configured to be inserted within the hollow feature, the staking component configured to secure the set screw from rotation.

2. The device of claim 1, further comprising a first handle connected to an external surface of the base.

3. The device of claim 2, wherein the base and the first handle form a geometric shape with dimensions larger than an access aperture of a turbine.

4. The device of claim 1, wherein the inner component is rotatable within the hollow feature.

5. The device of claim 1, wherein the operative tip includes a first set of threads configured to mate with a second set of threads defined by a countersink in the balance weight.

6. A system, comprising:
    a balance weight including a set-screw;
    a base including:
        a hollow feature, and
        an operative tip connected to the balance weight;
    an inner component configured to be inserted and removed from the hollow feature of the base, the inner component including an inner tip configured to manipulate the set screw; and
    a staking component configured to be inserted and removed from the hollow feature, wherein the staking component is configured to secure the set screw from rotation.

7. The system of claim 6, wherein the balance weight includes a countersink disposed about the set-screw, the countersink configured to connect to the operative tip.

8. The system of claim 6, further comprising a first handle connected to an external surface of the base.

9. The system of claim 8, wherein the base and the first handle form a geometric shape with dimensions larger than an access aperture of a turbine.

10. The system of claim 6, wherein the inner component is rotatable within the hollow feature.

11. A method comprising:
    connecting a device to a balance weight, the balance weight including a set screw and the device including an inner component with an inner tip configured to manipulate the set screw;
    maneuvering the balance weight within a turbine via the device;
    connecting the balance weight to the turbine with the inner tip;
    removing the inner component from a hollow feature of the device following manipulation of the set screw to attach the balance weight to the turbine wherein the device remains connected to the balance weight
    installing a staking component into the device after removal of the inner component, and
    staking the set screw to the turbine with the staking component.

12. The method of claim 11, wherein the connecting the balance weight to the turbine includes manipulating the set screw in the turbine by manipulating the inner component of the device.

13. The method of claim 11, further comprising:
    disconnecting the device from the balance weight; and
    removing the device from the turbine.

* * * * *